April 18, 1967  S. P. HIGGINS, JR  3,315,250
ELECTRICAL APPARATUS
Filed March 29, 1963

INVENTOR.
STEPHEN P. HIGGINS, JR.
BY
ATTORNEY.

United States Patent Office 3,315,250
Patented Apr. 18, 1967

3,315,250
ELECTRICAL APPARATUS
Stephen P. Higgins, Jr., Fairview Village, Pa., assignor to Honeywell Inc., a corporation of Delaware
Filed Mar. 29, 1963, Ser. No. 269,004
3 Claims. (Cl. 340—347)

This invention relates to transducers. More specifically, the present invention relates to digital to analog transducers.

An object of the present invention is to provide an improved digital to analog transducer directly operable by a digital computer.

Another object of the present invention is to provide an improved digital to analog transducer having means for checking the operation thereof by a digital computer.

Still another object of the present invention is to provide an improved digital to analog transducer operative to rapidly position a movable element.

A further object of the present invention is to provide a digital signal responsive valve.

A still further object of the present invention is to provide an improved digital to analog transducer, as set forth herein, having a simple operation and construction.

In accomplishing these and other objects, there has been provided, in accordance with the present invention, a digital to analog transducer having a pair of stepping motors responsive to separately applied digital control signals from a digital computer. These motors are used to rotate respective cam elements to provide independent coarse and fine adjustments of an operative relationship between a flapper and a nozzle. This change in the relationship between the nozzle and flapper combination may be used to vary an energizing fluid pressure for a valve operator. The valve operator is arranged to respond to the change in pressure by operating a valve mechanism to a new position. The motion of the valve is communicated to the flapper and nozzle combination to unite the combination and restore a balanced fluid pressure for the operator whereby to terminate the motion of the valve, which valve is retained at the desired new position. The motion of the stepping motors may be sensed by potentiometer means driven thereby and communicated to the computer as a check on the effect of the digital control signals.

A better understanding of the present invention may be had when the following detailed description is read in connection with the accompanying drawings, in which.

Figure 1:
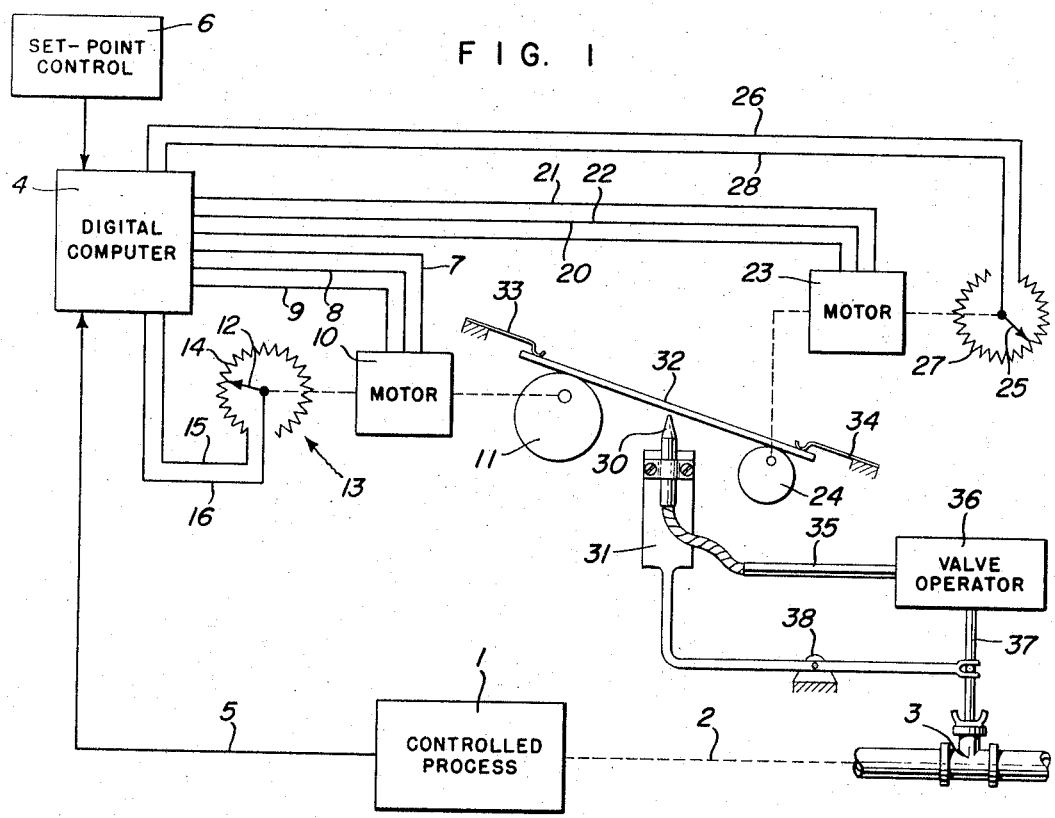
FIG. 1 is a pictorial view of a digital transducer embodying the present invention.

Referring to FIG. 1 in more detail, there is shown a digital transducer embodying the present invention. A controlled process 1 is shown having a fluid input line 2 connected thereto with a valve 3 interposed in the fluid line 2. A digital computer 4 is used to sense the state of the process 1 along a connecting signal line 5. Further, the computer 4 is arranged to compare a signaled condition of the process 1 with a set-point, representative of a desired process condition level, from a set-point control 6.

A digital output signal from the computer 4 is supplied as a pair of digital control signals. These control signals are produced by the computations of the computer 4 in response to the condition of the process 1, the set-point control 6 and a predetermined control program within the computer 4. The control signals are characterized into a coarse process control signal and a fine process control signal. The coarse signal is applied along a pair of lines 7 and 8 having a common return line 9 to a stepping motor 10. The motor 10 may be any suitble device operative to produce an increment of rotation in response to a digital input signal pulse applied thereto.

The motor 10 is arranged to drive a cam element 11 and the wiper 12 of a potentiometer 13. A resistance element 14 of the potentiometer 13 has one end connected along a line 15 to the computer 4. Similarly, the wiper 12 is connected along a line 16 to the computer 4. The fine digital control signal is applied on one of a pair of lines 20, 21 with a common return line 22 to a stepping motor 23. The motor 23 is used to drive a cam 24 and a potentiometer wiper 25. The wiper 25 is connected along a line 28 to the computer 4. A potentiometer resistance element 27, wiped by the wiper 25, is connected at one end thereof to the computer 4 by a line 26.

A fluid nozzle 30 is carried by an arm 31 and is arranged to cooperate with a fluid impermeable flapper plate 32 to control the effective opening of the nozzle 30. The plate 32 is supported by the cams 11 and 24 and is held thereto by a pair of springs 33, 34 arranged at respective ends of the plate 32. The angle of the plate 32 as supported by cams 11 and 24 has been exaggerated in the showing in FIG. 1 for the purpose of clearly illustrating the mechanical relationship thereof. The nozzle 30 is connected by a fluid line 35 to a valve operator 36. The valve operator 36 may be energized by a fluid supply to produce a motion of a valve stem 37 and the valve 3. The nozzle 30 and flapper 32 are used to control a fluid bypass path for the fluid supply by regulating the effective opening of the nozzle 30. This bypass of the driving fluid for the operator 36 is effective to produce a balanced condition of the operator 36 to define a position of the valve 3. A change in this effective opening is effective to upset this balanced condition and produce a corresponding motion of the valve stem 37. In order to restore the balanced condition of the operator 36 through an offset of the change in the aforesaid effective opening, the arm 31 is pivoted at pivot 38 and is arranged to follow the motion of the valve stem 37. The motion of arm 31 is effective to move nozzle 30 to offset the motion of the plate 32.

In operation, the present invention is operative to regulate the opening of the valve 3 in response to digital control output signals from the computer 4. These output signals are divided into a coarse control digital signal which is applied to motor 10 and a fine control digital signal which is applied to motor 23. These digital signals are representative of the results of the computations performed by the digital computer 4 upon the signals from the process 1 and set-point control 6. The motors 10 and 23 may be either reversible or non-reversible. In the case of non-reversible motors, the motors 10 and 23 would each have only two input lines and similar digital control signals would be applied to produce incremental positioning of the motors 10 and 23. Advantageously, the motors 10 and 23 may be reversible to produce a faster response to control the process 1, particularly, if a return of the motor to a prior position is desired.

As shown in FIG. 1, the motors 10 and 23 each have two pairs of input lines with a common return line shared by each of the two pairs. For example, the motor 10 has two separate input lines 7 and 8 with a common return line 9. The digital signals applied on lines 7 and 8 are arranged to have opposite effects on the motor 10; i.e., the digital signals applied along line 7 drive the motor 10 in an opposite direction from that produced by the signals applied along line 8. Similarly, motor 23 is driven by digital signals applied along either line 20 or line 21 with a common signal return line 22. It will be appreciated that the combination of two stepping motors to produce a joint effect on the plate 32 is effective to allow a rapid positioning of the plate 32 inasmuch as both motors may be operated simultaneously. However, even the operation of the motors in succession is also effective to provide a rapid positioning of the plate 32 since a large number of plate positions may be provided by a small number of motor positions. For example, to provide approximately a thousand positions of the plate 32, the motors 10 and 23 need only have 32 positions each. Each motor can, therefore, rotate through its small number of positions to reach a large plate deflection in a short time, and the joint time is less than a single motor having a thousand positions which must be individually passed to reach a high number position. Further, the cost and accuracy considerations of a motor having a small number of positions are improved over a motor having a very large number of positions.

Assume it is desired to separate the plate 32 from the nozzle 30. The initial positions of the motors 10 and 23 may be sensed by the digital computer 4 through the respective potentiometers attached to the motor shaft. For example, in the case of motor 10, the wiper 12 of potentiometer 13 is operated by the motor 10, and the resistance across lines 15 and 16 connected to the potentiometer 13 is a measure of the angular position of the motor 10. The position of the motor 10 is, also, an indication of the position of cam 11. Similarly, the position of motor 23 and cam 24 is sensed by the computer 4 along lines 26 and 28. This initial position information may be used by the computer to determine the number of digital pulses to be applied to each motor and the direction of rotation desired by each motor. Thus, the control signals supplied to the motors 10 and 23 are effective to rotate the coarse cam 11 and fine cam 24 to separate the plate 32 from the nozzle 30 by a desired amount as determined by the joint cam rotation. To provide a desired relationship between the movement of the coarse cam 11 and the fine cam 24, it is necessary to apportion the radii of the cams to obtain the desired ratio. However, if a high ratio; e.g., 30 to 1, is desired, it may not be practical to supply cams having such a radii ratio. Accordingly, the nozzle 30 may be moved off-center to provide a lever arm ratio to the cams to change the effect of each cam on the nozzle-flapper relationship. Thus, by moving the nozzle to a point toward the coarse cam 11 which is ¼ of the distance between the cams, the effect of the coarse cam 11 is three times the effect of the fine cam 24. Accordingly, a 30 to 1 ratio of the cam effects may be effected by cams having a 10 to 1 radii ratio. This separation is effective to decrease the fluid pressure in line 35.

The decrease in pressure is effective to decrease the energizing fluid pressure in valve operator 36 and is arranged to produce a movement of the valve stem 37 in a direction to close the valve 3. The movement of the valve stem 37 is communicated through arm 31 to the nozzle 30 and is effective to conjoin the nozzle 30 and plate 32. The movement of the nozzle 30 toward the plate 32 is effective to restore the fluid pressure in the operator 36 to produce a balanced condition thereof and terminate any further movement of the valve stem 37 and valve 3. This balanced condition of the operator 36 is produced by a balance between the fluid pressure energizing the operator 36 and the mechanical resiliency of the mechanism of the operator 36 and valve 3, which mechanism may include bias springs or any other suitable elements.

The rotation of the motors 10 and 23 is also effective to move potentiometer wipers 12 and 25, respectively. Thus, the computer 4 is provided with an indication of the terminal position of the motors 10 and 23 which indication may be used as a check of the effect of the digital control signals upon the motors 10 and 23. Conversely, the valve 3 may be opened by the application of digital signals to motors 10 and 23 to close the gap between the plate 32 and nozzle 30. This movement is effective to increase the pressure in line 35 and operator 36. An increase in pressure in the operator 36 is effective to produce a movement of valve stem 37 in a direction to open the valve 3. The movement of stem 37 is communicated to the nozzle 30 to unite the flapper plate 32 and nozzle 30 whereby to restore a balanced pressure in the operator 36. The restoration of a balanced condition of the operator 36 is effective to terminate any further movement of the stem 37 and valve 3. Thus, the valve 3 is left in a desired open condition. The operation of the motors 10 and 23 may again be checked by the computer 4 along lines 15, 16 and lines 20 and 21, respectively.

Figure 2:
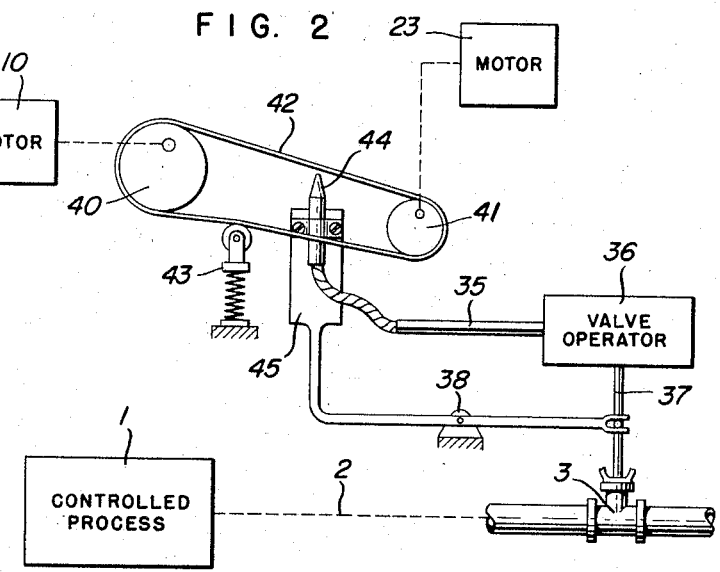
FIG. 2 is a pictorial view of a part of FIG. 1 showing a modification thereof also embodying the present invention.

Referring now to FIG. 2, there is shown a modification of the transducer structure shown in FIG. 1 and also embodying the present invention. Similar numbers have been retained for the partial showing of the elements shared by this modification with the structure shown in FIG. 1. The omitted structure of the modification shown in FIG. 2 is substantially identical with that shown in FIG. 1 and discussed above in detail. In the modified structure of FIG. 2, the coarse drive motor 10 is arranged to drive a coarse cam wheel 40, and the fine drive motor 23, a fine cam wheel 41. A fluid impermeable belt 42 is positioned on the wheels 40 and 41 and is tensioned by a spring-loaded idler 43. A nozzle 44 is mounted on arm 45 and arranged to cooperate with the belt 42 to form a flapper and nozzle combination. The nozzle 44 is arranged to be connected by pipe 35 to the valve operator 36. The operation of this embodiment is similar to that discussed above with relation to FIG. 1 with the exception that the rotation of motors 10 and 23 is herein effective to rotate cam wheels 40 and 41, respectively. The rotation of the cam wheels 40 and 41 is arranged to vary the separation of belt 42 and nozzle 44. Thus, the belt 42 is arranged to act as a flapper to vary the fluid pressure in line 35 and operator 36. The belt 42 is tensioned upon the wheels 40 and 41 by idler 43 to provide an accurate position of the belt 42 which position is dependent on the positions of the cam wheels 40 and 41. The movement of stem 37 is communicated by arm 45 to nozzle 44 to restore a balanced pressure in the valve operator 36 and terminate the movement of stem 37.

Thus, it may be seen that there has been provided, in accordance with the present invention, a digitally responsive transducer which is positioned by digital signals directly from a digital computer and is provided with a means for checking the operation of the transducer as used in the present embodiment as a valve operator.

What is claimed is:

1. A digital to analog transducer comprising
   a positionable analog element,
   an element operator operative to position said element in response to a fluid energizing signal applied to said operator,
   a coarse setting means,
   a fine setting means,
   a first stepping motor operative to rotate said coarse setting means incrementally in accordance with first digital signals applied to said motor,
   a second stepping motor operative to rotate said fine setting means incrementally in accordance with second digital signals applied to said second motor,
   a fluid nozzle,
   support means for said nozzle positioned by said operator along with said element,
   a fluid impermeable flapper cooperating with said nozzle and arranged to be positioned relative thereto by the joint action of said coarse and fine setting means,
   and means connecting said nozzle to said operator to control said energizing signal to cause said operator to position said element to maintain a predetermined positional relationship between said nozzle and said flapper.

2. A transducer as specified in claim 1, wherein said coarse setting means includes a coarse cam and said fine setting means includes a fine cam, and wherein said flapper is a plate maintained in contact with said cams and positioned relative to said nozzle in accordance with the relative positions of said cams.

3. A transducer as specified in claim 1, wherein said coarse setting means includes a coarse cam wheel and said fine setting means includes a fine cam wheel, and wherein said flapper is a belt disposed around and in contact with said wheels and positioned relative to said nozzle in accordance with the relative positions of said wheels.

References Cited by the Examiner

UNITED STATES PATENTS 2,987,661  6/1961  Schweitz _____ 340—347
3,081,942  3/1963  Maclay _____ 340—347

MALCOLM A. MORRISON, *Primary Examiner.*

A. J. SARLI, *Assistant Examiner.*